US012567184B2

(12) United States Patent
Zhuge et al.

(10) Patent No.: US 12,567,184 B2
(45) Date of Patent: Mar. 3, 2026

(54) VIDEO PROCESSING METHOD, APPARATUS AND DEVICE

(71) Applicant: Beijing Zitiao Network Technology Co., Ltd., Beijing (CN)

(72) Inventors: Jingjing Zhuge, Beijing (CN); Ziyu Li, Beijing (CN); Yanhao Shen, Beijing (CN); Guangyao Ni, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 168 days.

(21) Appl. No.: 18/551,967

(22) PCT Filed: Mar. 21, 2022

(86) PCT No.: PCT/CN2022/082095

§ 371 (c)(1),
(2) Date: Sep. 22, 2023

(87) PCT Pub. No.: WO2022/213801

PCT Pub. Date: Oct. 13, 2022

(65) Prior Publication Data

US 2024/0177374 A1      May 30, 2024

(30) Foreign Application Priority Data

Apr. 9, 2021    (CN) .......................... 202110385345.3

(51) Int. Cl.
*G06T 11/00* (2006.01)

(52) U.S. Cl.
CPC ........ *G06T 11/001* (2013.01); *G06T 2210/32* (2013.01)

(58) Field of Classification Search
CPC ... G06T 11/001; G06T 2210/32; H04N 21/44; H04N 21/458; H04N 21/2668;

(Continued)

(56) References Cited

U.S. PATENT DOCUMENTS

2002/0156842 A1* 10/2002 Signes ................... H04L 65/70
                                                                    348/E7.071
2010/0023863 A1      1/2010 Cohen-Martin
(Continued)

FOREIGN PATENT DOCUMENTS

CN          101448089 A      6/2009
CN          101946500 A      1/2011
(Continued)

OTHER PUBLICATIONS

China National Intellectual Property Administration, Notice of Allowance Issued in Application No. 202110385345.3, May 7, 2024, 11 pages.

(Continued)

*Primary Examiner* — Robin J Mishler
(74) *Attorney, Agent, or Firm* — Alleman Hall LLP

(57)          ABSTRACT

Embodiments of the present disclosure provide a video processing method, an apparatus and a device. The method includes: receiving a video generating request; acquiring a video template according to the video generating request, where the video template includes a plurality of placeholders, where each of the placeholders is configured to indicate at least one of a text type, an image type and a video type; acquiring a plurality of materials according to the video generating request, where types of the plurality of the materials include at least one of a text type, an image type and a video type; based on the types of the materials, importing the plurality of the materials into positions of corresponding placeholders in the video template respectively and performing rendering to obtain a synthesized video.

17 Claims, 4 Drawing Sheets

(58) Field of Classification Search
CPC ......... H04N 21/4532; H04N 21/47205; H04N 21/854; H04N 21/2353; H04N 21/4331
See application file for complete search history.

(56) References Cited

U.S. PATENT DOCUMENTS

| | | | |
|---|---|---|---|
| 2012/0063747 A1 | 3/2012 | Braun et al. | |
| 2013/0195429 A1 | 8/2013 | Fay et al. | |
| 2015/0221000 A1* | 8/2015 | Cohen-Martin | G06Q 30/02 |
| | | | 705/14.73 |
| 2017/0238067 A1 | 8/2017 | Sharma et al. | |
| 2017/0359628 A1* | 12/2017 | Sachdev | H04N 21/435 |
| 2021/0185378 A1* | 6/2021 | Rajendran | H04N 21/854 |

FOREIGN PATENT DOCUMENTS

| | | | |
|---|---|---|---|
| CN | 103928039 A | 7/2014 | |
| CN | 107770626 A | 3/2018 | |
| CN | 108737892 A | 11/2018 | |
| CN | 109168028 A | 1/2019 | |
| CN | 109769141 A | 5/2019 | |
| CN | 110060317 A | 7/2019 | |
| CN | 110072120 A | 7/2019 | |
| CN | 110708596 A | 1/2020 | |
| CN | 111131727 A | 5/2020 | |
| CN | 111222063 A | 6/2020 | |
| CN | 111669623 A | 9/2020 | |
| CN | 111966931 A | 11/2020 | |

OTHER PUBLICATIONS

China National Intellectual Property Administration, Office Action and Search Report Issued in Application No. 202110385345.3, Jul. 11, 2023, 9 pages. Submitted with partial English translation.

ISA China National Intellectual Property Administration, International Search Report and Written Opinion Issued in Application No. PCT/CN2022/082095, Jun. 13, 2022, WIPO, 15 pages.

China National Intellectual Property Administration, Office Action and Search Report Issued in Application No. 202110385345.3, Nov. 21, 2023, 15 pages.

* cited by examiner

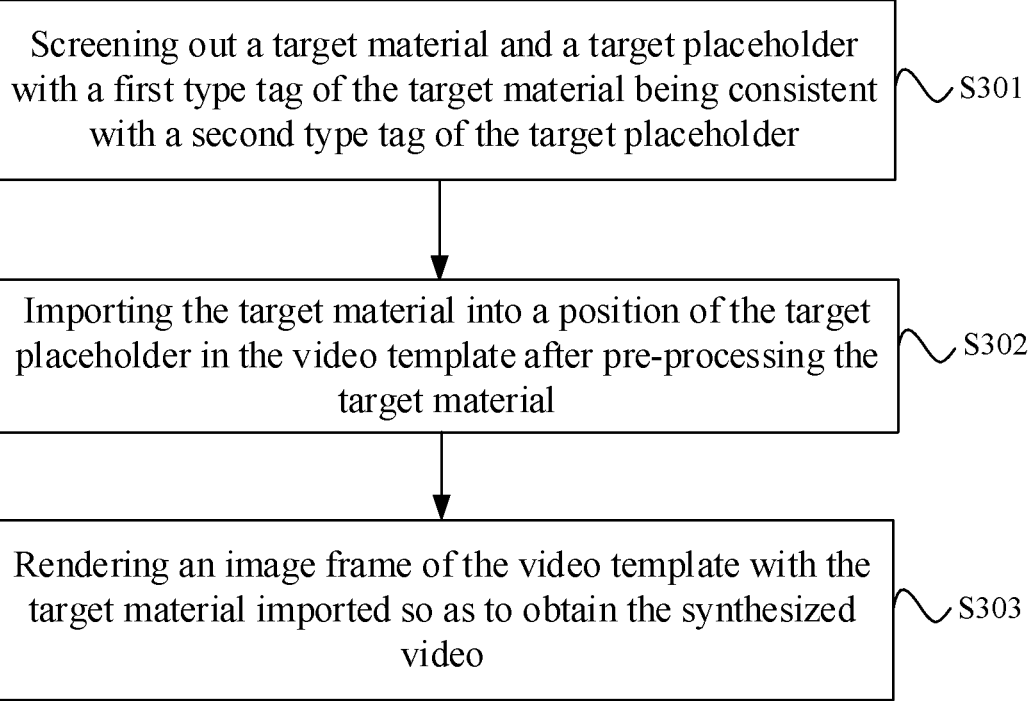

Screening out a target material and a target placeholder with a first type tag of the target material being consistent with a second type tag of the target placeholder ⟋S301

Importing the target material into a position of the target placeholder in the video template after pre-processing the target material ⟋S302

Rendering an image frame of the video template with the target material imported so as to obtain the synthesized video ⟋S303

FIG. 3

401 Receiving module

402 First acquisition module

403 Second acquisition module

404 Rendering module

Electronic device 500

501 Processing apparatus

502 ROM

503 RAM

504

505

I/O interface

506 Input apparatus

507 Output apparatus

508 Storage apparatus

509 Communication apparatus

VIDEO PROCESSING METHOD, APPARATUS AND DEVICE

CROSS-REFERENCE TO RELATED APPLICATION

This application is a National Stage of International Application No. PCT/CN2022/082095, filed on Mar. 21, 2022, which claims priority to Chinese patent application No. 202110385345.3, filed to China National Intellectual Property Administration on Apr. 9, 2021 and entitled "Video Processing Method, Apparatus and Device". The above applications are hereby incorporated by reference in their entireties.

TECHNICAL FIELD

Embodiments of the present disclosure relate to the technical field of video processing and, in particular, to a video processing method, an apparatus, a device, a storage medium, a computer program product and a computer program.

BACKGROUND

With the improvement of hardware performance of client devices and the continuous progress of artificial intelligence technology, there are more and more applications (APPs) running on the client devices. For some video-type APPs, in a traditional video rendering process, a user can only render content according to a rendering template of a single type, and thus a final rendered video is obtained with a single effect, which cannot meet the user's demand for video diversity.

SUMMARY

Embodiments of the present disclosure provide a video processing method, an apparatus, a device, a storage medium, a computer program product and a computer program. Using the method, multiple types of materials including text, an image and a video can be rendered based on placeholders and a rendered video including multiple types of materials can be generated, improving user experience.

In a first aspect, an embodiment of the present disclosure provides a video processing method, including:

receiving a video generating request;

acquiring a video template according to the video generating request, where the video template includes a plurality of placeholders, where each of the placeholders is configured to indicate at least one of a text type, an image type and a video type;

acquiring a plurality of materials according to the video generating request, where types of the plurality of the materials include at least one of a text type, an image type and a video type; and based on the types of the materials, importing the plurality of the materials into positions of corresponding placeholders in the video template respectively and performing rendering to obtain a synthesized video.

In a second aspect, an embodiment of the present disclosure provides a video processing apparatus, including:

a receiving module, configured to receive a video generating request;

a first acquisition module, configured to acquire a video template according to the video generating request, where the video template includes a plurality of placeholders, where each of the placeholders is configured to indicate at least one of a text type, an image type and a video type;

a second acquisition module, configured to acquire a plurality of materials according to the video generating request, where types of the plurality of the materials include at least one of a text type, an image type and a video type;

a rendering module, configured to, based on the types of the materials, import the plurality of the materials into positions of corresponding placeholders in the video template respectively and perform rendering to obtain a synthesized video.

In a third aspect, an embodiment of the present disclosure provides an electronic device, including: a processor and a memory;

the memory stores computer execution instructions;

the processor executes the computer execution instructions to cause the electronic device to perform the video processing method as described in the first aspect above.

In a fourth aspect, an embodiment of the present disclosure provides a computer-readable storage medium, where the computer-readable storage medium stores computer execution instructions, and when a processor executes the computer execution instructions, the video processing method as described in the first aspect above is implemented.

In a fifth aspect, an embodiment of the present disclosure provides a computer program product including a computer program, where the video processing method as described in the first aspect above is implemented when the computer program is executed by a processor.

In a sixth aspect, an embodiment of the present disclosure provides a computer program, where the video processing method as described in the first aspect above is implemented when the computer program is executed by a processor.

The embodiments provide a video processing method, an apparatus, a device, a storage medium, a computer program product and a computer program. In the method, a video generating request from a user is received first, and then a video template and a plurality of materials are acquired according to the video generating request, where the video template includes a plurality of placeholders, each placeholder indicating at least one of a text type, an image type and a video type, and the plurality of the materials include at least one of text, an image and a video; then, based on types of the materials, the plurality of the materials are imported into positions of corresponding placeholders in the video template respectively and rendering is performed to obtain a synthesized video. In the embodiments of the present disclosure, multiple types of materials including the text, the image and the video are rendered based on the placeholders to obtain a rendered video, which can generate the rendered video including multiple types of materials, improving user experience.

BRIEF DESCRIPTION OF DRAWINGS

In order to more clearly illustrate the technical solutions in embodiments of the present disclosure or in the prior art, the following is a brief description of the drawings required to be used in the description of the embodiments or the prior art. It is clear that the drawings in the following description are some of the embodiments of the present disclosure, and that other drawings can be obtained from these drawings by those of ordinary skill in the art without creative effort.

FIG. 3 is schematic flowchart II of a video processing method provided by an embodiment of the present disclosure.

DESCRIPTION OF EMBODIMENTS

In order to make the purposes, technical solutions and advantages of embodiments of the present disclosure clearer, the technical solutions in the embodiments of the present disclosure will be described clearly and completely below in conjunction with the drawings in the embodiments of the present disclosure. It is clear that the embodiments described are a part of the embodiments of the present disclosure, and not all of them. Based on the embodiments in the present disclosure, all other embodiments obtained by those of ordinary skill in the art without creative effort fall within the scope of protection of the present disclosure.

At present, in a traditional video rendering process, a user can only render a certain fixed type of content according to a fixed rendering template, and thus a final rendered video is obtained with a single effect, which cannot meet the user's demand for video diversity and brings poor user experience. In order to solve the above technical problems, an embodiment of the present disclosure provides a video processing method, in which a video template is acquired according to a user request, where the video template includes a plurality of placeholders, and each placeholder is configured to indicate at least one of a text type, an image type and a video type; a plurality of materials are acquired according to the user request, where the plurality of the materials include at least one of text, an image and a video; multiple types of the materials including the text, the image and the video are imported into positions of corresponding placeholders in the video template and rendering is performed to obtain a synthesized video. The multiple types of the materials including the text, the image and the video are rendered using the placeholders in the video template to obtain a rendered video, which improves user experience.

Figure 1:
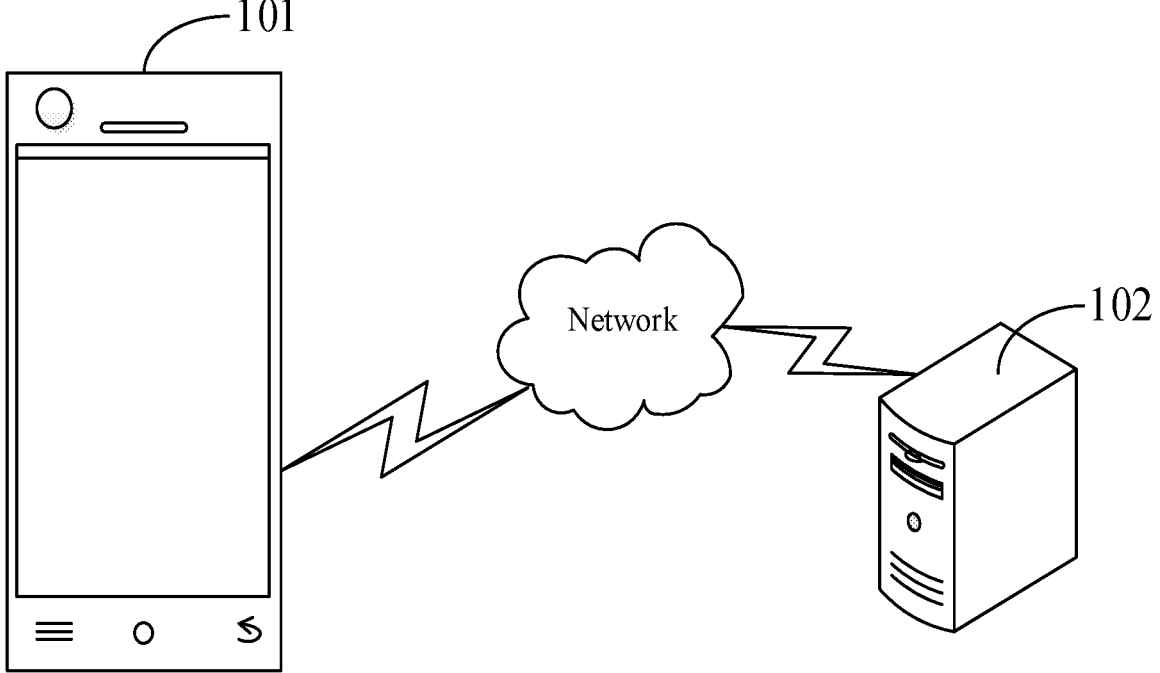
FIG. 1 is a schematic diagram of a scenario of a video processing method provided by an embodiment of the present disclosure.

Referring to FIG. 1, FIG. 1 is a schematic diagram of a scenario of a video processing method provided by an embodiment of the present disclosure. As shown in FIG. 1, a system provided in this embodiment includes a client 101 and a server 102. The client 101 can be installed on devices such as cell phones, tablets, personal computers, wearable electronic devices and smart home devices. This embodiment does not particularly limit the implementation of the client 101, as long as input and output interaction with a user can be performed on this client 101. The server 102 may include one server or a cluster of several servers.

Figure 2:
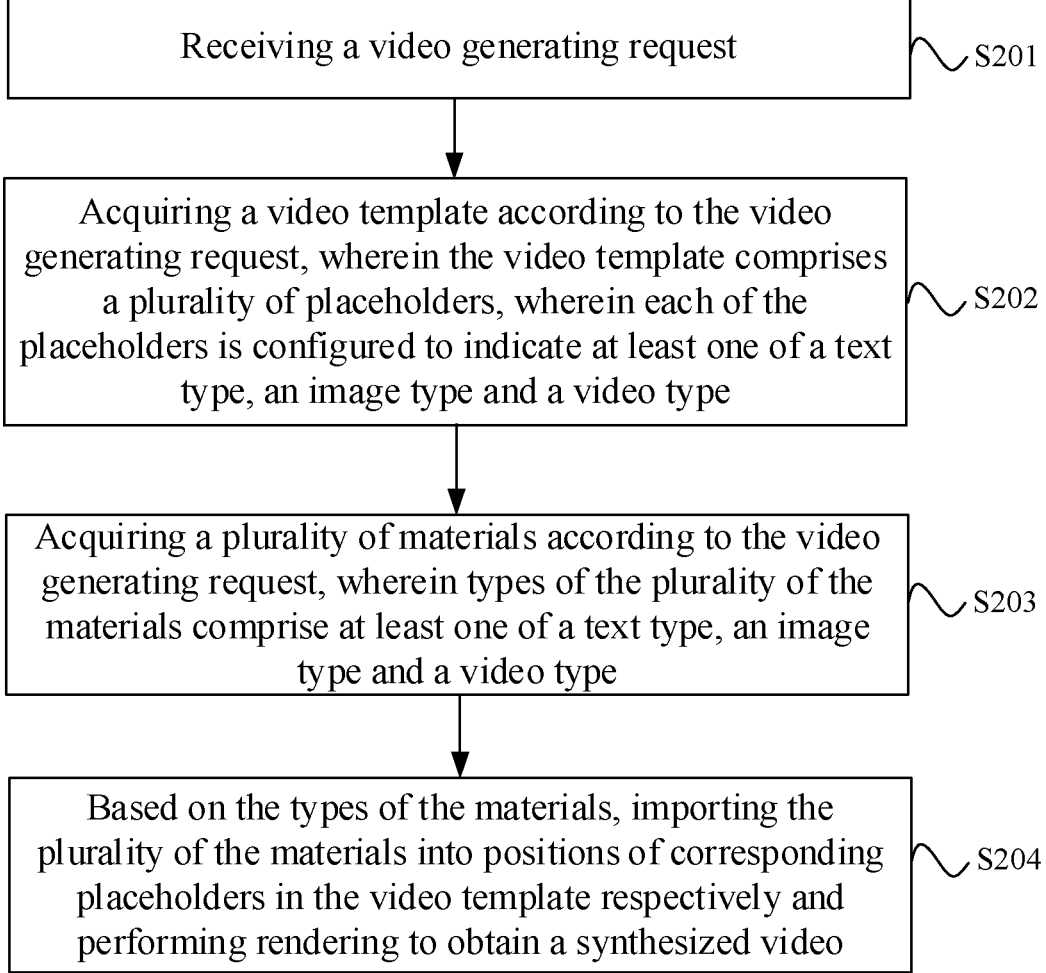
FIG. 2 is schematic flowchart I of a video processing method provided by an embodiment of the present disclosure.

Referring to FIG. 2, FIG. 2 is schematic flowchart I of a video processing method provided by an embodiment of the present disclosure. The method of this embodiment can be applied to the server shown in FIG. 1, and the video processing method includes the following steps.

S201: receiving a video generating request.

Specifically, a video generating request from any client is received.

In an embodiment of the present disclosure, the client can be installed on mobile terminals such as personal computers, tablets and cell phones, wearable electronic devices, smart home devices and other devices. The client can send the video generating request from a user to the server.

S202: acquiring a video template according to the video generating request, where the video template includes a plurality of placeholders, where each of the placeholders is configured to indicate at least one of a text type, an image type and a video type.

Specifically, the video template may be acquired from a video template library, where the video template includes a plurality of placeholders. Each placeholder may be provided with a corresponding type tag, and the type tag is configured to indicate that the corresponding placeholder belongs to at least one of the text type, the image type and the video type.

In an embodiment, the placeholder may have a preset format and include at least one of the following parameters: a type tag for indicating a material type (e.g., at least one of the text type, the image type and the video type) supported by the placeholder; a placeholder identifier for indicating a corresponding rendering effect, a material resolution, etc. Besides, when the placeholder supports a material in the video type, the placeholder may also include the following parameters: a start time of a video material, an end time of the video material, a start time of a to-be-synthesized video, and an end time of the to-be-synthesized video.

In an embodiment of the present disclosure, acquiring the video template from the video template library may include the following two manners.

In manner I, a video template can be randomly selected from the video template library in response to the video generating request.

In manner II, the user can select a corresponding video template or video template type at the client, and user selection information is added into the video generating request according to the selection by the user at the client; the server parses the user selection information after receiving the video generating request, and selects the video template determined by the user at the client from the video template library according to the user selection information.

In an embodiment of the present disclosure, before step S201, a process of establishing a video template includes:

acquiring a video template producing material, where the video template producing material includes at least one of a rendering material and a cutscene animation; pre-adding a plurality of placeholders; producing a video template according to the video template producing material and the pre-added plurality of the placeholders.

The pre-added plurality of the placeholders are configured to indicate at least the following three kinds of type information including: an image, text and a video. Here, the text may include a word, a number and a symbol, etc.

S203: acquiring a plurality of materials according to the video generating request, where types of the plurality of the materials include at least one of a text type, an image type and a video type.

In an embodiment, the materials may be acquired from a material library (which may include a database).

S204: based on the types of the materials, importing the plurality of the materials into positions of corresponding placeholders in the video template respectively and performing rendering to obtain a synthesized video.

In an embodiment of the present disclosure, the plurality of the materials may include at least one of multiple types of the text type, the image type and the video type, and the corresponding placeholders in the video template may also be at least one of the multiple types of the placeholders including those indicating the text type, the image type and the video type.

Specifically, according to the types of the materials, each type of materials are imported into the positions of the placeholders corresponding to that type, so that the materials replace the placeholders. Image frames of the video template with the materials imported are rendered frame by frame, and then the synthesized video is obtained.

As can be seen from the above description, the video generating request is first received from the user, and then the video template and the plurality of the materials are acquired according to the video generating request, where the video template includes the plurality of the placeholders, each placeholder is configured to indicate at least one of the text type, the image type and the video type, and the plurality of the materials include at least one of the text, the image and the video; then based on the types of the materials, the plurality of the materials are respectively imported into the positions of the corresponding placeholders in the video template and rendering is performed to obtain the synthesized video. In the embodiments of the present disclosure, the multiple types of the materials including the text, the image and the video are rendered based on the placeholders to obtain a rendered video, which can provide the user with the rendered video including the multiple types of the materials and improve user experience.

The above describes the video processing method according to the embodiments of the present disclosure in combination with the server. It should be understood by those skilled in the art that the video processing method according to the embodiments of the present disclosure may also be performed by a device installed with a client, or, by an all-in-one device that integrates server functions and client functions. For the sake of brevity, the specific steps and methods will not be repeated.

Referring to FIG. 3, FIG. 3 is schematic flowchart II of a video processing method provided by an embodiment of the present disclosure. In this embodiment, the above material includes a first type tag for indicating a type of the material; the placeholder includes a second type tag for indicating a type indicated by the placeholder; accordingly, in step S204, based on the types of the materials, importing the plurality of the materials into the positions of the corresponding placeholders in the video template respectively and performing the rendering to obtain the synthesized video may specifically include the following steps.

S301: screening out a target material and a target placeholder with a first type tag of the target material being consistent with a second type tag of the target placeholder.

In an embodiment, a placeholder in the video template can be identified, specifically including: acquiring each video template image frame from the video template according to a video timestamp of a to-be-synthesized video; determining whether a placeholder exists in each video template image frame; if the placeholder exists, identifying the placeholder, and acquiring a second type tag of the placeholder.

Specifically, all materials are traversed according to the second type tag of the placeholder until a first type tag consistent with the second type tag of the placeholder is found by a query, then a material corresponding to this first type tag is determined to be the target material, and the corresponding placeholder is the target placeholder. The second type tag being consistent with the first type tag may include that type information indicated by the tags are consistent. In an implementation, both the first type tag and the second type tag include a "tag" tag.

In an embodiment of the present disclosure, each material includes a corresponding first type tag, and the first type tag may be added by material generation. For example, the first type tag may be first number information for each material, and the first number information may be customized by the client to indicate any material.

A placeholder in the video template may be a placeholder that is added when the video template is produced. Meanwhile each placeholder is configured with a predefined second type tag, and each predefined second type tag is configured to indicate a material type that the placeholder matches. For example, the second type tag may be second number information that matches the first number information of the material.

In addition, in an embodiment, all placeholders can be traversed according to the first type tag of the material until a second type tag consistent with the first type tag of the material is found by a query. A specific screening process is similar to the above and will not be repeated for the sake of brevity.

S302: importing the target material into a position of the target placeholder in the video template after pre-processing the target material.

In an embodiment of the present disclosure, the materials can be divided into three types: text materials, image materials and video materials. Depending on different types of target materials, different pre-processing methods are used to process the target materials, so as to import them into positions of corresponding target placeholders in the video template.

S303: rendering an image frame of the video template with the target material imported so as to obtain the synthesized video.

In an embodiment of the present disclosure, rendering is performed on each frame of the video template with the target material imported, to obtain the synthesized video.

The video template with the target material imported has the target placeholder, and rendering is performed using a corresponding rendering effect according to the target placeholder. Specifically, a renderer corresponding to the target placeholder in the video template is identified according to a parameter (e.g., a placeholder identifier) in the target placeholder; the image frame of the video template with each material imported is rendered according to a rendering effect of the renderer.

The renderer may include a shader renderer, and the shader renderer is configured to indicate rendering effect properties such as a position, a shape, transparency and a dynamic effect of a placeholder material.

As can be seen from the above description, by matching the tag of the placeholder with the tag of the material, the materials can be imported into the corresponding positions of the video template and rendering can be performed accordingly to enhance a presentation effect of the synthesized video.

In a video processing method provided in another embodiment of the present disclosure, the importing of each target material into the position of the target placeholder in the video template after pre-processing the each target material in the above step S302 is mainly described. A detailed description is as follows.

S3021: if the target material includes a text material, importing the text material into the position of the target placeholder in the video template after performing processing of typesetting and texture format conversion on the text material.

In an embodiment of the present disclosure, the processing of typesetting can be performed on the text material according to features such as a size or shape of the placeholder, and the text material subject to the processing of typesetting can be converted to a texture format.

S3022: if the target material includes an image material, importing the image material into the position of the target placeholder in the video template after performing processing of texture format conversion on the image material.

In an embodiment of the present disclosure, an image file format may include BMP, TGA, JPG, GIF, PNG and other formats. After being converted to a texture format, the texture format may include R5G6B5, A4R4G4B4, A1R5G5B5, R8G8B8, A8R8G8B8 and other formats. Known or future developed processing methods for texture format conversion can be used to perform the processing of texture format conversion on the image material, and the present disclosure does not limit the specific processing method for texture format conversion.

S3023: if the target material includes a video material, extracting an image frame from the video material and importing the extracted image frame into the position of the target placeholder in the video template after performing processing of texture format conversion on the image frame.

In an embodiment of the present disclosure, for the video material, it is necessary to screen out corresponding image frames of the video material from the video material according to a timestamp of a to-be-synthesized video.

A specific process of extracting an image frame from the video material includes: determining a first start timestamp and a first end timestamp of the video material in the to-be-synthesized video; determining a second start timestamp and a second end timestamp indicated by the target placeholder; calculating a target timestamp of an image frame to be extracted from the video material according to a timestamp of a current rendered frame of the to-be-synthesized video, the first start timestamp, the first end timestamp, the second start timestamp and the second end timestamp; extracting the image frame from the video material according to the target timestamp.

Calculating the target timestamp of the image frame extracted from the video material according to the timestamp of the current rendered frame of the to-be-synthesized video, the first start timestamp, the first end timestamp, the second start timestamp and the second end timestamp includes:

acquiring a time length indicated by the placeholder according to the second end timestamp and the second start timestamp;

acquiring a proportional time length of the target timestamp located in the video material according to a product of the time length indicated by the placeholder and a ratio of a difference between the timestamp of the current rendered frame and the first start timestamp to a difference between the first end timestamp and the first start timestamp;

acquiring the target timestamp according to the second start timestamp and the proportional time length of the target timestamp to the video material.

For calculating the target timestamp of the image frame to be extracted from the video material according to the timestamp of the current rendered frame of the to-besynthesized video, the first start timestamp, the first end timestamp, the second start timestamp and the second end timestamp, a specific formula for a calculation process thereof can be:

$$t_{src} = src_{in} + \frac{curTime - dest_{in}}{dest_{out} - dest_{in}} * (src_{out} - src_{in})$$

where $t_{src}$ is the target timestamp of the extracted image frame; $dest_{in}$ is the first start timestamp; $dest_{out}$ is the first end timestamp; $src_{in}$ is the second start timestamp; $src_{out}$ is the second end time stamp; and curTime is the timestamp of the current rendered frame. By the above formula, the target timestamp of the extracted image frame can be acquired, so as to extract the image frame from the video material according to the target timestamp.

As can be seen from the above description, by preprocessing the text material, the image material and the video material, it is possible to achieve matched inputting of different type forms of materials and further enhance a video effect.

In an embodiment of the present disclosure, extracting the image frame from the video material according to the target timestamp includes: if a time length of the video material is less than the time length indicated by the placeholder corresponding to the video material in the video template, continuing image frame extraction from a starting point of the video material again.

The time length indicated by the placeholder may be obtained according to a difference between the second start timestamp and the second end timestamp indicated by the placeholder.

Specifically, the image frame is extracted from the video material according to the timestamp of the extracted image frame. If the time length of the video material is less than the time length indicated by the placeholder in the video template, the image frame extraction is continued by resuming back to the starting point of the video material, i.e., the extracted image frame idx=(tsrc % T)×fps (% is taking remainders), where T is the time length of the video material and fps is a frame rate.

As can be seen from the above description, the integrity of the input video material is ensured through continuing the image frame extraction by resuming back to the starting point of the video material, which thus prevents the synthesized video from having a problem of missing a picture in the content.

In an embodiment of the present disclosure, the video processing method provided in the above embodiments can be performed by the server, and the video generating request comes from the client. Accordingly, after importing the plurality of the materials into the positions of the corresponding placeholders in the video template respectively and performing the rendering to obtain the synthesized video in the above step S204, the method further includes: sending the synthesized video to the client. By sending the synthesized video to the client, the user experience is further enhanced.

Figure 4:
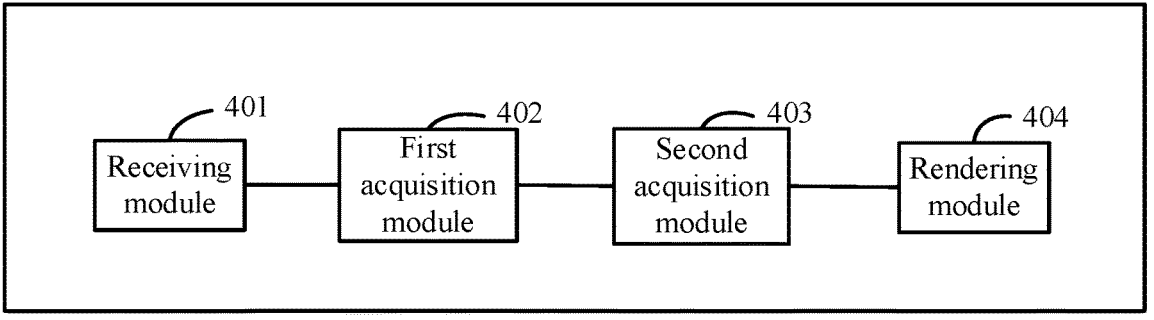
FIG. 4 is a structural block diagram of a video processing apparatus provided by an embodiment of the present disclosure.

Corresponding to the video processing method of the above embodiments, FIG. 4 is a structural block diagram of a video processing apparatus provided by an embodiment of the present disclosure. For ease of illustration, only those portions relevant to embodiments of the present disclosure are shown. Referring to FIG. 4, the apparatus includes: a receiving module 401, a first acquisition module 402, a second acquisition module 403 and a rendering module 404.

The receiving module 401 is configured to receive a video generating request;

the first acquisition module 402 is configured to acquire a video template according to the video generating request, where the video template includes a plurality of placeholders, where each of the placeholders is configured to indicate at least one of a text type, an image type and a video type;

the second acquisition module 403 is configured to acquire a plurality of materials according to the video generating request, where types of the plurality of the materials include at least one of a text type, an image type and a video type;

the rendering module 404 is configured to, based on the types of the materials, importing the plurality of the materials into positions of corresponding placeholders in the video template respectively and performing rendering to obtain a synthesized video.

According to one or more embodiments of the present disclosure, the materials include first type tags and the placeholders include second type tags; the rendering module 404 includes:

a screening unit 4041, configured to screen out a target material and a target placeholder with a first type tag of the target material being consistent with a second type tag of the target placeholder;

an importing unit 4042, configured to import the target material into a position of the target placeholder in the video template after pre-processing the target material;

a rendering unit 4043, configured to render an image frame of the video template with the target material imported so as to obtain the synthesized video.

According to one or more embodiments of the present disclosure, the rendering unit 4043 includes:

a first rendering subunit 40431, configured to, if the target material includes a text material, importing the text material into the position of the target placeholder in the video template after performing processing of type-setting and texture format conversion on the text material;

a second rendering subunit 40432, configured to, if the target material includes an image material, importing the image material into the position of the target placeholder in the video template after performing processing of texture format conversion on the image material;

a third rendering subunit 40433, configured to, if the target material includes a video material, extracting an image frame from the video material, and importing the extracted image frame into the position of the target placeholder in the video template after performing processing of texture format conversion on the extracted image frame.

According to one or more embodiments of the present disclosure, the third rendering subunit 40433 is specifically configured to: determine a first start timestamp and a first end timestamp of the video material in a to-be-synthesized video; determine a second start timestamp and a second end timestamp indicated by the target placeholder; calculate a target timestamp of an image frame extracted from the video material according to a timestamp of a current rendered frame of the to-be-synthesized video, the first start time-stamp, the first end timestamp, the second start timestamp and the second end timestamp; extract the image frame from the video material according to the target timestamp.

According to one or more embodiments of the present disclosure, the third rendering subunit 40433 is specifically configured to: acquire a time length indicated by the place-holder according to the second end timestamp and the second start timestamp; acquire a proportional time length of the target timestamp located in the video material according to a product of the time length indicated by the placeholder and a ratio of a difference between the timestamp of the current rendered frame and the first start timestamp to a difference between the first end timestamp and the first start timestamp; acquire the target timestamp according to the second start timestamp and the proportional time length of the target timestamp to the video material.

Specifically, a formula for calculating the target time-stamp of the image frame to be extracted from the video material according to the timestamp of the current rendered frame of the to-be-synthesized video, the first start time-stamp, the first end timestamp, the second start timestamp and the second end timestamp is:

$$t_{src} = src_{in} + \frac{curTime - dest_{in}}{dest_{out} - dest_{in}} * (src_{out} - src_{in})$$

where $t_{src}$ is the target timestamp of the extracted image frame; $dest_{in}$ is the first start timestamp; $dest_{out}$ is the first end timestamp; $src_{in}$ is the second start timestamp; $src_{out}$ is the second end time stamp; and curTime is the timestamp of the current rendered frame.

According to one or more embodiments of the present disclosure, the third rendering subunit 40433 is further configured to, if a time length of the video material is less than the time length indicated by the placeholder corre-sponding to the video material in the video template, con-tinue image frame extraction from a starting point of the video material again.

According to one or more embodiments of the present disclosure, the rendering unit 4043 is specifically configured to: identify a renderer corresponding to the target place-holder in the video template; render the image frame of the video template with the target material imported according to a rendering effect of the renderer.

According to one or more embodiments of the present disclosure, the apparatus further includes: a producing mod-ule 405, configured to: acquire a video template producing material, where the video template producing material includes at least one of a rendering material and a cutscene animation; pre-adding the plurality of the placeholders; producing the video template according to the video tem-plate producing material and the pre-added plurality of the placeholders.

According to one or more embodiments of the present disclosure, the apparatus is applied to a server, and the video generating request comes from a client; the apparatus further includes:

a sending module 406, configured to send the synthesized video to the client after importing the plurality of the materials into the positions of the corresponding place-holders in the video template respectively and perform-ing the rendering to obtain the synthesized video.

The apparatus provided in the embodiments can be used to perform the technical solutions of the above method embodiments with similar implementation principles and technical effects, which will not be repeated here in this embodiment.

In order to implement the above embodiments, an embodiment of the present disclosure also provides an electronic device.

Figure 5:
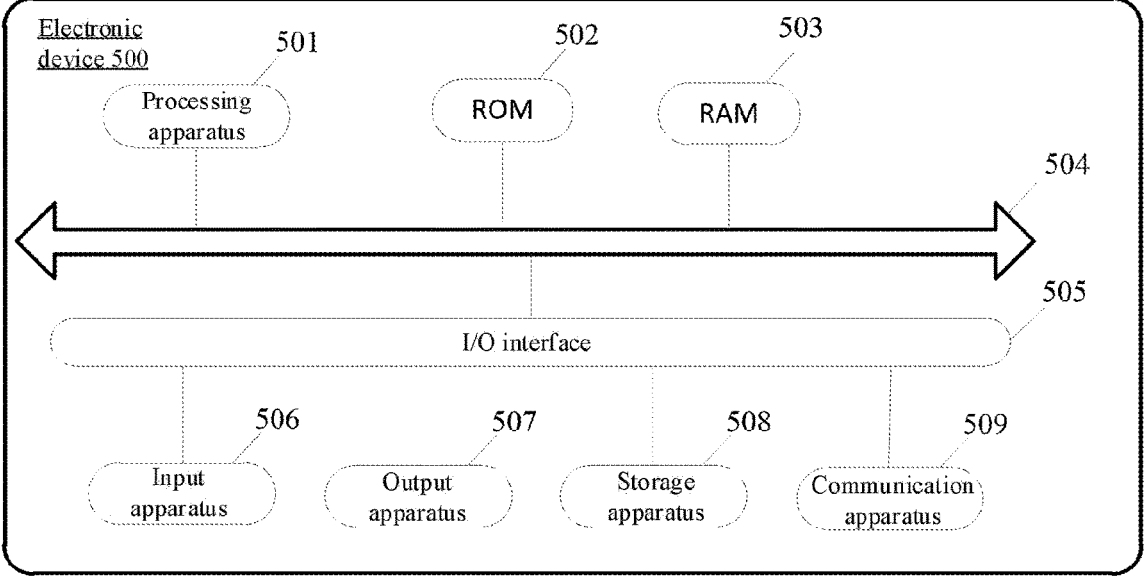
FIG. 5 is a schematic diagram of a hardware structure of an electronic device provided by an embodiment of the present disclosure.

Referring to FIG. 5, which illustrates a schematic structural diagram of an electronic device 500 suitable for implementing an embodiment of the present disclosure, the electronic device 500 may be a client device or a server. The client device may include, but is not limited to, mobile clients such as a cell phone, a laptop computer, a digital radio receiver, a Personal Digital Assistant (PDA), a Portable Android Device (PAD), a Portable Media Player (PMP), an in-car client (e.g., a car navigation client) a wearable electronic device, etc., and fixed clients such as a digital TV (Television), a desktop computer, a smart home device, etc. The electronic device illustrated in FIG. 5 is only an example and should not impose any limitations on the functionality and scope of use of embodiments of the present disclosure.

As shown in FIG. 5, the electronic device 500 may include a processing apparatus (e.g., a central processing unit, a graphics processor, etc.) 501 that may perform various appropriate actions and processing according to a program stored in a Read Only Memory (ROM) 502 or a program loaded from a storage apparatus 508 into a Random Access Memory (RAM) 503, thereby implementing the video processing method according to the embodiments of the present disclosure. In the RAM 503, various programs and data required for operations of the electronic device 500 are also stored. The processing apparatus 501, ROM 502 and RAM 503 are connected to each other via a bus 504. An Input/Output (I/O) interface 505 is also connected to the bus 504.

Typically, the following apparatuses can be connected to the I/O interface 505: an input apparatus 506 including, for example, a touch screen, a touch pad, a keyboard, a mouse, a camera, a microphone, an accelerometer, a gyroscope, etc.; an output apparatus 507 including, for example, a Liquid Crystal Display (LCD), a speaker, a vibrator, etc.; the storage apparatus 508 including, for example, a magnetic tape, a hard disk, etc.; and a communication apparatus 509. The communication apparatus 509 may allow the electronic device 500 to communicate wirelessly or wired with other devices to exchange data. Although FIG. 5 illustrates the electronic device 500 with various apparatuses, it should be understood that it is not required to implement or have all of the apparatuses illustrated. More or fewer apparatuses may alternatively be implemented or available.

In particular, according to the embodiments of the present disclosure, the process described above with reference to the flowchart may be implemented as a computer software program. For example, an embodiment of the present disclosure includes a computer program product including a computer program carried on a computer-readable medium, and the computer program includes program code for performing the method shown in the flowchart. In such an embodiment, the computer program may be downloaded and installed from a network via the communication apparatus 509, or be installed from the storage apparatus 508, or be installed from the ROM 502. When this computer program is executed by the processing apparatus 501, the above-described functions as defined in the method of the embodiments of the present disclosure are performed.

It is to be noted that the computer-readable medium described above in the present disclosure may be a computer-readable signal medium or a computer-readable storage medium or any combination of the above. The computer-readable storage medium may be, for example—but not limited to—an electrical, magnetic, optical, electromagnetic, infrared or semiconductor system, apparatus or device, or any combination of the above. A more specific example of the computer-readable storage medium may include, but is not limited to: an electrical connection with one or more wires, a portable computer disk, a hard disk, a random access memory (RAM), a read only memory (ROM), an erasable programmable read only memory (Erasable Programmable ROM, EPROM or flash memory), an optical fiber, a portable compact disk read only memory (Compact Disc ROM, CD-ROM), an optical storage device, a magnetic memory device, or any suitable combination of the foregoing. In the present disclosure, the computer-readable storage medium may be any tangible medium that includes or stores a program that may be used by or in combination with an instruction execution system, apparatus or device. While in the present disclosure, the computer-readable signal medium may include a data signal propagated in the baseband or as part of a carrier wave, where computer-readable program code is carried. Such propagated data signal may take a variety of forms, including but not limited to an electromagnetic signal, an optical signal, or any suitable combination of the foregoing. The computer-readable signal medium may also be any computer-readable medium other than the computer-readable storage medium, and the computer-readable signal medium can send, propagate or transmit programs used by or in combination of the instruction execution system, apparatus or device. The program code included on the computer-readable medium may be transmitted by any suitable medium, including but not limited to: a wire, a fiber optic cable, radio frequency (RF), etc., or any suitable combination of the above.

The above computer-readable medium may be included in the above electronic device; or may be separate and not assembled into the electronic device.

The above computer-readable medium carries one or more programs, and when the above one or more programs are executed by the electronic device, the electronic device is caused to perform the method shown in the above embodiments.

The computer program code for performing the operations of the present disclosure may be written in one or more programming languages or combinations thereof, the programming languages including object-oriented programming languages—such as Java, Smalltalk, C++, and also including conventional procedural programming languages—such as "C" language or similar programming languages. The program code may be executed entirely on a user computer, executed partially on the user computer, executed as a stand-alone package, executed partially on the user computer and partially on a remote computer, or executed entirely on the remote computer or server. In the case involving a remote computer, the remote computer may be connected to the user computer over any kind of network—including a Local Area Network (LAN) or a Wide Area Network (WAN)—or, may be connected to an external computer (e.g., using an Internet service provider to connect over the Internet).

The flowcharts and block diagrams in the drawings illustrate the possible implementations of the architectures, functionalities and operations of systems, methods and computer program products according to various embodiments of the present disclosure. At this point, each block in the flowcharts or block diagrams may represent a module, a program segment, or a portion of code that includes one or more executable instructions for implementing a specified logical function. It should also be noted that in some implementations as replacements, the functions indicated in the blocks may also occur in a different order than that indicated in the drawings. For example, two blocks represented one after the other may actually be executed in substantially parallel, and they may sometimes be executed in the opposite order, depending on the function involved. Note also that each block in the block diagrams and/or flowcharts, and the combination of blocks in the block diagrams and/or flowcharts, may be implemented with a dedicated hardware-based system that performs the specified function or operation, or may be implemented with a combination of dedicated hardware and computer instructions.

The units described in the embodiments of the present disclosure may be implemented in software or in hardware. The name of a unit does not constitute a limitation to the unit itself in certain circumstances. For example, the first acquisition unit may also be described as "a unit for acquiring at least two Internet protocol addresses".

The functions described above herein may be performed, at least in part, by one or more hardware logic components. For example, without limitation, exemplary types of hardware logic components that may be used include a Field Programmable Gate Array (FPGA), an Application Specific Integrated Circuit (ASIC), an Application Specific Standard Product (ASSP), a System on Chip (SOC), a Complex Programmable Logic Device (CPLD), etc.

In the context of the present disclosure, a machine-readable medium may be a tangible medium that may include or store a program for use by or in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the foregoing. A more specific example of the machine-readable storage medium would include an electrical connection based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic memory device, or any suitable combination of the foregoing.

In a first aspect, according to one or more embodiments of the present disclosure, a video processing method is provided, including:

receiving a video generating request;

acquiring a video template according to the video generating request, where the video template includes a plurality of placeholders, where each of the placeholders is configured to indicate at least one of a text type, an image type and a video type;

acquiring a plurality of materials according to the video generating request, where types of the plurality of the materials include at least one of a text type, an image type and a video type; and based on the types of the materials, importing the plurality of the materials into positions of corresponding placeholders in the video template respectively and performing rendering to obtain a synthesized video.

According to one or more embodiments of the present disclosure, the materials include first type tags and the placeholders include second type tags; based on the types of the materials, importing the plurality of the materials into the positions of the corresponding placeholders in the video template respectively and performing the rendering to obtain the synthesized video includes: screening out a target material and a target placeholder with a first type tag of the target material being consistent with a second type tag of the target placeholder; importing the target material into a position of the target placeholder in the video template after pre-processing the target material; rendering an image frame of the video template with the target material imported so as to obtain the synthesized video.

According to one or more embodiments of the present disclosure, importing the target material into the position of the target placeholder in the video template after pre-processing the target material includes: if the target material includes a text material, importing the text material into the position of the target placeholder in the video template after performing processing of typesetting and texture format conversion on the text material; if the target material includes an image material, importing the image material into the position of the target placeholder in the video template after performing processing of texture format conversion on the image material; if the target material includes a video material, extracting an image frame from the video material, and importing the extracted image frame into the position of the target placeholder in the video template after performing processing of texture format conversion on the extracted image frame.

According to one or more embodiments of the present disclosure, extracting the image frame from the video material includes: determining a first start timestamp and a first end timestamp of the video material in a to-be-synthesized video; determining a second start timestamp and a second end timestamp indicated by the target placeholder; calculating a target timestamp of an image frame to be extracted from the video material according to a timestamp of a current rendered frame of the to-be-synthesized video, the first start timestamp, the first end timestamp, the second start timestamp and the second end timestamp; extracting the image frame from the video material according to the target timestamp.

According to one or more embodiments of the present disclosure, calculating the target timestamp of the image frame to be extracted from the video material according to the timestamp of the current rendered frame of the to-be-synthesized video, the first start timestamp, the first end timestamp, the second start timestamp and the second end timestamp includes: acquiring a time length indicated by the placeholder according to the second end timestamp and the second start timestamp; acquiring a proportional time length of the target timestamp located in the video material according to a product of the time length indicated by the placeholder and a ratio of a difference between the timestamp of the current rendered frame and the first start timestamp to a difference between the first end timestamp and the first start timestamp; acquiring the target timestamp according to the second start timestamp and the proportional time length of the target timestamp to the video material.

According to one or more embodiments of the present disclosure, extracting the image frame from the video material according to the target timestamp includes: if a time length of the video material is less than the time length indicated by the placeholder corresponding to the video material in the video template, continuing image frame extraction from a starting point of the video material again.

According to one or more embodiments of the present disclosure, rendering the image frame of the video template with the target material imported includes: identifying a renderer corresponding to the target placeholder in the video template; rendering the image frame of the video template with the target material imported according to a rendering effect of the renderer.

According to one or more embodiments of the present disclosure, before receiving the video generating request, the method further includes: acquiring a video template producing material, where the video template producing material includes at least one of a rendering material and a cutscene animation; pre-adding the plurality of the placeholders; producing the video template according to the video template producing material and the pre-added plurality of the placeholders.

In a second aspect, according to one or more embodiments of the present disclosure, a video processing apparatus is provided, including:

a receiving module, configured to receive a video generating request;

a first acquisition module, configured to acquire a video template according to the video generating request, where the video template includes a plurality of placeholders, where each of the placeholders is configured to indicate at least one of a text type, an image type and a video type;

a second acquisition module, configured to acquire a plurality of materials according to the video generating request, where types of the plurality of the materials include at least one of a text type, an image type and a video type;

a rendering module, configured to, based on the types of the materials, import the plurality of the materials into positions of corresponding placeholders in the video template respectively and perform rendering to obtain a synthesized video.

According to one or more embodiments of the present disclosure, the materials include first type tags and the placeholders include second type tags; the rendering module includes: a screening unit, configured to screen out a target material and a target placeholder with a first type tag of the target material being consistent with a second type tag of the target placeholder; an importing unit, configured to import the target material into a position of the target placeholder in the video template after pre-processing the target material; a rendering unit, configured to render an image frame of the video template with the target material imported so as to obtain the synthesized video.

According to one or more embodiments of the present disclosure, the rendering module includes: a first rendering subunit, configured to, if the target material includes a text material, import the text material into the position of the target placeholder in the video template after performing processing of typesetting and texture format conversion on the text material; a second rendering subunit, configured to, if the target material includes an image material, import the image material into the position of the target placeholder in the video template after performing processing of texture format conversion on the image material; a third rendering subunit, configured to, if the target material includes a video material, extract an image frame from the video material, and import the extracted image frame into the position of the target placeholder in the video template after performing processing of texture format conversion on the extracted image frame.

According to one or more embodiments of the present disclosure, the third rendering subunit is specifically configured to: determine a first start timestamp and a first end timestamp of the video material in a to-be-synthesized video; determine a second start timestamp and a second end timestamp indicated by the target placeholder; calculate a target timestamp of an image frame extracted from the video material according to a timestamp of a current rendered frame of the to-be-synthesized video, the first start timestamp, the first end timestamp, the second start timestamp and the second end timestamp; extract the image frame from the video material according to the target timestamp.

According to one or more embodiments of the present disclosure, the third rendering subunit is specifically configured to: acquire a time length indicated by the placeholder according to the second end timestamp and the second start timestamp; acquiring a proportional time length of the target timestamp located in the video material according to a product of the time length indicated by the placeholder and a ratio of a difference between the timestamp of the current rendered frame and the first start timestamp to a difference between the first end timestamp and the first start timestamp; acquiring the target timestamp according to the second start timestamp and the proportional time length of the target timestamp to the video material.

According to one or more embodiments of the present disclosure, the third rendering subunit is further configured to, if a time length of the video material is less than the time length indicated by the placeholder corresponding to the video material in the video template, continue image frame extraction from a starting point of the video material again.

According to one or more embodiments of the present disclosure, the rendering unit is specifically configured to: identify a renderer corresponding to the target placeholder in the video template; render the image frame of the video template with the target material imported according to a rendering effect of the renderer.

According to one or more embodiments of the present disclosure, the apparatus further includes: a producing module, configured to: acquire a video template producing material, where the video template producing material includes at least one of a rendering material and a cutscene animation; pre-adding the plurality of the placeholders; producing the video template according to the video template producing material and the pre-added plurality of the placeholders.

In a third aspect, according to one or more embodiments of the present disclosure, an electronic device is provided, including: a processor and a memory;

the memory stores computer execution instructions;

the processor executes the computer execution instructions to cause the electronic device to perform the video processing method as described in the first aspect above and in various possible designs of the first aspect.

In a fourth aspect, according to one or more embodiments of the present disclosure, a computer-readable storage medium is provided, where the computer-readable storage medium stores computer execution instructions, and when a processor executes the computer execution instructions, the video processing method as described in the first aspect above and in various possible designs of the first aspect is implemented.

In a fifth aspect, an embodiment of the present disclosure provides a computer program product including a computer program, where the video processing method as described in the first aspect above and in various possible designs of the first aspect is implemented when the computer program is executed by a processor.

In a sixth aspect, an embodiment of the present disclosure provides a computer program, where the video processing method as described in the first aspect above and in various possible designs of the first aspect is implemented when the computer program is executed by a processor.

The above description is only embodiments of the present disclosure and a description of the technical principles applied. It should be understood by those skilled in the art that the scope of the disclosure covered by the present disclosure is not limited to technical solutions formed by specific combinations of the above technical features, but should also cover other technical solutions formed by any combination of the above technical features or their equivalent features without departing from the above disclosed concept, for example, technical solutions formed by interchanging the above features with (but not limited to) the technical features with similar functions disclosed in the present disclosure.

Furthermore, although a specific order is used to depict the operations, this should not be interpreted as requiring that these operations be executed in the specific order shown or in sequential order of execution. Multitasking and parallel processing may be advantageous in certain environments. Again, while several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments individually or in any suitable subcombination.

Although the present subject matter has been described using language specific to structural features and/or method logical actions, it should be understood that the subject matter defined in the appended claims is not necessarily limited to the particular features or actions described above. Instead, the particular features and actions described above are merely exemplary forms of implementations of the claims.

The invention claimed is:

1. A video processing method, applied to a server, wherein the method comprises:

receiving a video generating request from a client;

acquiring a video template according to the video generating request, wherein the video template comprises a plurality of placeholders, wherein each of the placeholders is configured to indicate at least one of a text type, an image type, or a video type;

acquiring a plurality of materials according to the video generating request, wherein types of the plurality of the materials comprise at least one of a text type, an image type, or a video type; and based on the types of the materials, importing the plurality of the materials into positions of corresponding placeholders in the video template respectively and performing rendering to obtain a synthesized video;

wherein the materials comprise first type tags and the placeholders comprise second type tags;

wherein based on the types of the materials, importing the plurality of the materials into the positions of the corresponding placeholders in the video template respectively and performing the rendering to obtain the synthesized video comprises:

screening the plurality of the materials and the corresponding placeholders to obtain a target material and a target placeholder with a first type tag of the target material being consistent with a second type tag of the target placeholder;

importing the target material into a position of the target placeholder in the video template after preprocessing the target material; and rendering an image frame of the video template with the target material imported so as to obtain the synthesized video; and wherein when a placeholder supports a material of the video type, the placeholder comprises the following parameters: a start time of the material of the video type, an end time of the material of the video type, a start time of a to-be-synthesized video, and an end time of the to-be-synthesized video; and wherein the first type tags comprise first number information for the materials, the first number information being customized by the client to indicate the materials, and the second type tags comprise second number information that matches the first number information.

2. The method according to claim 1, wherein importing the target material into the position of the target placeholder in the video template after pre-processing the target material comprises:

upon determining that the target material comprises a text material, importing the text material into the position of the target placeholder in the video template after performing processing of typesetting and texture format conversion on the text material;

upon determining that the target material comprises an image material, importing the image material into the position of the target placeholder in the video template after performing processing of texture format conversion on the image material; and upon determining that the target material comprises a video material, extracting an image frame from the video material, and importing the extracted image frame into the position of the target placeholder in the video template after performing processing of texture format conversion on the extracted image frame.

3. The method according to claim 2, wherein extracting the image frame from the video material comprises:

determining a first start timestamp and a first end timestamp of the video material in a to-be-synthesized video;

determining a second start timestamp and a second end timestamp indicated by the target placeholder;

calculating a target timestamp of an image frame to be extracted from the video material according to a timestamp of a current rendered frame of the to-be-synthesized video, the first start timestamp, the first end timestamp, the second start timestamp and the second end timestamp; and extracting the image frame from the video material according to the target timestamp.

4. The method according to claim 3, wherein calculating the target timestamp of the image frame to be extracted from the video material according to the timestamp of the current rendered frame of the to-be-synthesized video, the first start timestamp, the first end timestamp, the second start timestamp and the second end timestamp comprises:

acquiring a time length indicated by the target placeholder according to the second end timestamp and the second start timestamp;

acquiring a proportional time length of the target timestamp located in the video material according to a product of the time length indicated by the target placeholder and a ratio of a difference between the timestamp of the current rendered frame and the first start timestamp to a difference between the first end timestamp and the first start timestamp; and acquiring the target timestamp according to the second start timestamp and the proportional time length of the target timestamp to the video material.

5. The method according to claim 3, wherein extracting the image frame from the video material according to the target timestamp comprises:

upon determining that a time length of the video material is less than a time length indicated by the target placeholder corresponding to the video material in the video template, continuing image frame extraction from a starting point of the video material again.

6. The method according to claim 1, wherein rendering the image frame of the video template with the target material imported comprises:

identifying a renderer corresponding to the target placeholder in the video template; and rendering, according to a rendering effect of the renderer, the image frame of the video template with the target material imported.

7. The method according to claim 1, further comprising, before receiving the video generating request from the client:

acquiring a video template producing material, wherein the video template producing material comprises at least one of a rendering material or a cutscene animation;

pre-adding the plurality of the placeholders; and producing the video template according to the video template producing material and the pre-added plurality of the placeholders.

8. A video processing server, wherein the server comprises:

a processor and a memory; wherein the memory stores computer execution instructions; and the processor executes the computer execution instructions to cause the processor to:

receive a video generating request from a client;

acquire a video template according to the video generating request, wherein the video template comprises a plurality of placeholders, wherein each of the placeholders is configured to indicate at least one of a text type, an image type, or a video type;

acquire a plurality of materials according to the video generating request, wherein types of the plurality of the materials comprise at least one of a text type, an image type, or a video type; and based on the types of the materials, import the plurality of the materials into positions of corresponding placeholders in the video template respectively and perform rendering to obtain a synthesized video;

wherein the materials comprise first type tags and the placeholders comprise second type tags;

wherein the processor executes the computer execution instructions to cause the processor to:

screen the plurality of the materials and the corresponding placeholders to obtain a target material and a target placeholder with a first type tag of the target material being consistent with a second type tag of the target placeholder;

import the target material into a position of the target placeholder in the video template after pre-processing the target material; and render an image frame of the video template with the target material imported so as to obtain the synthesized video; and wherein when a placeholder supports a material of the video type, the placeholder comprises the following parameters: a start time of the material of the video type, an end time of the material of the video type, a start time of a to-be-synthesized video, and an end time of the to-be-synthesized video; and wherein the first type tags comprise first number information for the materials, the first number information being customized by the client to indicate the materials, and the second type tags comprise second number information that matches the first number information.

9. A non-transitory computer-readable storage medium, wherein the computer-readable storage medium stores computer execution instructions, and when a processor of a server executes the computer execution instructions, the processor executes steps of:

receiving a video generating request from a client;

acquiring a video template according to the video generating request, wherein the video template comprises a plurality of placeholders, wherein each of the placeholders is configured to indicate at least one of a text type, an image type, or a video type;

acquiring a plurality of materials according to the video generating request, wherein types of the plurality of the materials comprise at least one of a text type, an image type, or a video type; and based on the types of the materials, importing the plurality of the materials into positions of corresponding placeholders in the video template respectively and performing rendering to obtain a synthesized video;

wherein the materials comprise first type tags and the placeholders comprise second type tags;

wherein based on the types of the materials, importing the plurality of the materials into the positions of the corresponding placeholders in the video template respectively and performing the rendering to obtain the synthesized video comprises:

screening the plurality of the materials and the corresponding placeholders to obtain a target material and a target placeholder with a first type tag of the target material being consistent with a second type tag of the target placeholder;

importing the target material into a position of the target placeholder in the video template after pre-processing the target material; and rendering an image frame of the video template with the target material imported so as to obtain the synthesized video; and wherein when a placeholder supports a material of the video type, the placeholder comprises the following parameters: a start time of the material of the video type, an end time of the material of the video type, a start time of a to-be-synthesized video, and an end time of the to-be-synthesized video; and wherein the first type tags comprise first number information for the materials, the first number information being customized by the client to indicate the materials, and the second type tags comprise second number information that matches the first number information.

10. The method according to claim 4, wherein extracting the image frame from the video material according to the target timestamp comprises:

upon determining that a time length of the video material is less than a time length indicated by the target placeholder corresponding to the video material in the video template, continuing image frame extraction from a starting point of the video material again.

11. The server according to claim 8, wherein the processor executes the computer execution instructions to cause the processor to:

upon determining that the target material comprises a text material, import the text material into the position of the target placeholder in the video template after performing processing of typesetting and texture format conversion on the text material;

upon determining that the target material comprises an image material, import the image material into the position of the target placeholder in the video template after performing processing of texture format conversion on the image material; and upon determining that the target material comprises a video material, extract an image frame from the video material, and import the extracted image frame into the position of the target placeholder in the video template after performing processing of texture format conversion on the extracted image frame.

12. The server according to claim 11, wherein the processor executes the computer execution instructions to cause the processor to:

determine a first start timestamp and a first end timestamp of the video material in a to-be-synthesized video;

determine a second start timestamp and a second end timestamp indicated by the target placeholder;

calculate a target timestamp of an image frame to be extracted from the video material according to a timestamp of a current rendered frame of the to-be-synthesized video, the first start timestamp, the first end timestamp, the second start timestamp and the second end timestamp; and extract the image frame from the video material according to the target timestamp.

13. The server according to claim 12, wherein the processor executes the computer execution instructions to cause the processor to:

acquire a time length indicated by the target placeholder according to the second end timestamp and the second start timestamp;

acquire a proportional time length of the target timestamp located in the video material according to a product of the time length indicated by the target placeholder and a ratio of a difference between the timestamp of the current rendered frame and the first start timestamp to a difference between the first end timestamp and the first start timestamp; and acquire the target timestamp according to the second start timestamp and the proportional time length of the target timestamp to the video material.

14. The server according to claim 12, wherein the processor executes the computer execution instructions to cause the processor to:

upon determining that a time length of the video material is less than a time length indicated by the target placeholder corresponding to the video material in the video template, continue image frame extraction from a starting point of the video material again.

15. The server according to claim 8, wherein the processor executes the computer execution instructions to cause the processor to:

identify a renderer corresponding to the target placeholder in the video template; and render, according to a rendering effect of the renderer, the image frame of the video template with the target material imported.

16. The server according to claim 8, wherein the processor executes the computer execution instructions to cause the processor to, before receiving the video generating request from the client:

acquire a video template producing material, wherein the video template producing material comprises at least one of a rendering material or a cutscene animation;

pre-add the plurality of the placeholders; and produce the video template according to the video template producing material and the pre-added plurality of the placeholders.

17. The server according to claim 13, wherein the processor executes the computer execution instructions to cause the processor to:

upon determining that a time length of the video material is less than a time length indicated by the target placeholder corresponding to the video material in the video template, continue image frame extraction from a starting point of the video material again.

* * * * *